Sept. 20, 1960                E. M. GLUHAREFF                2,953,319
                                CONVERTIPLANE
Filed Jan. 5, 1955                                        4 Sheets-Sheet 3

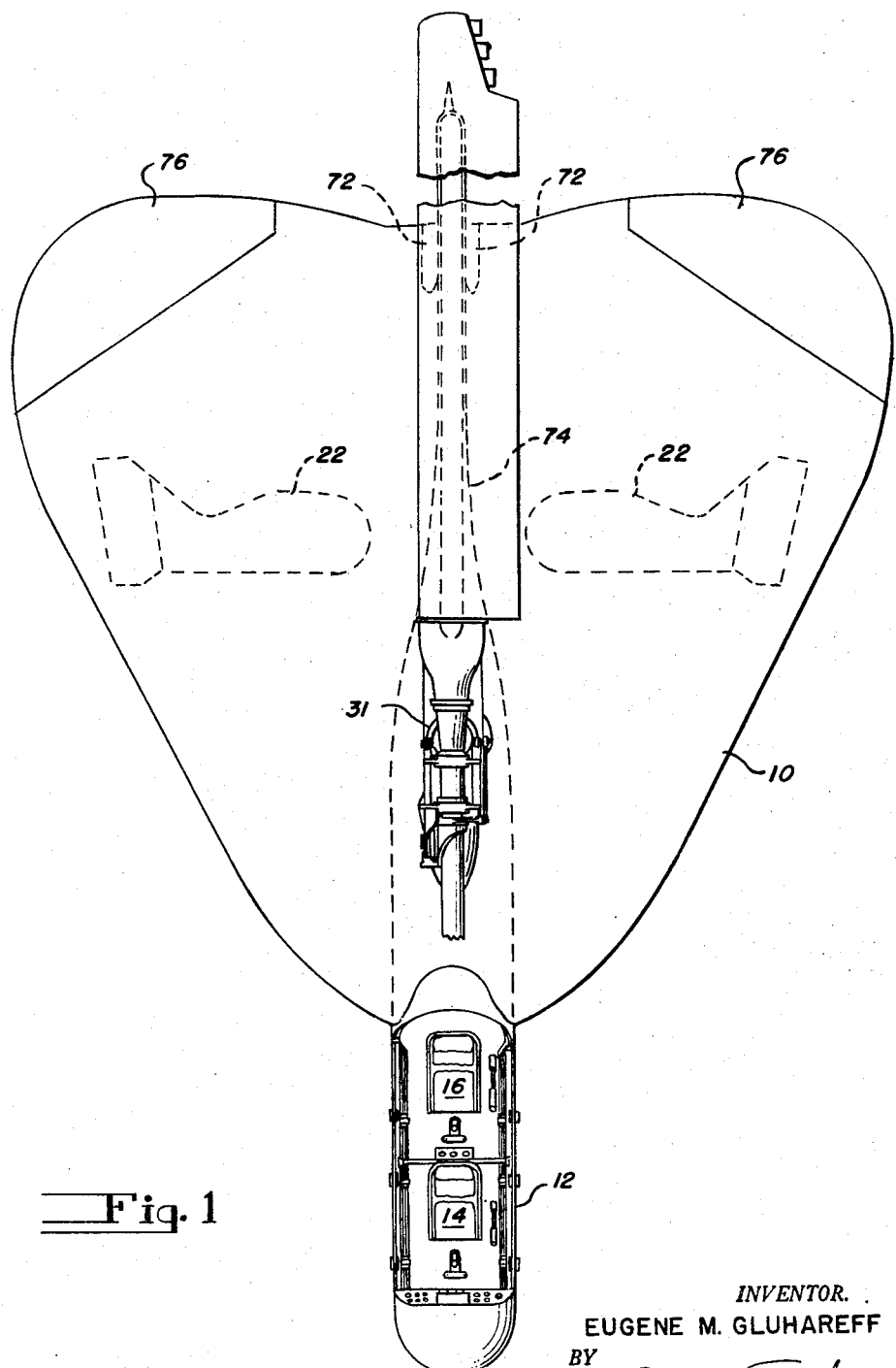

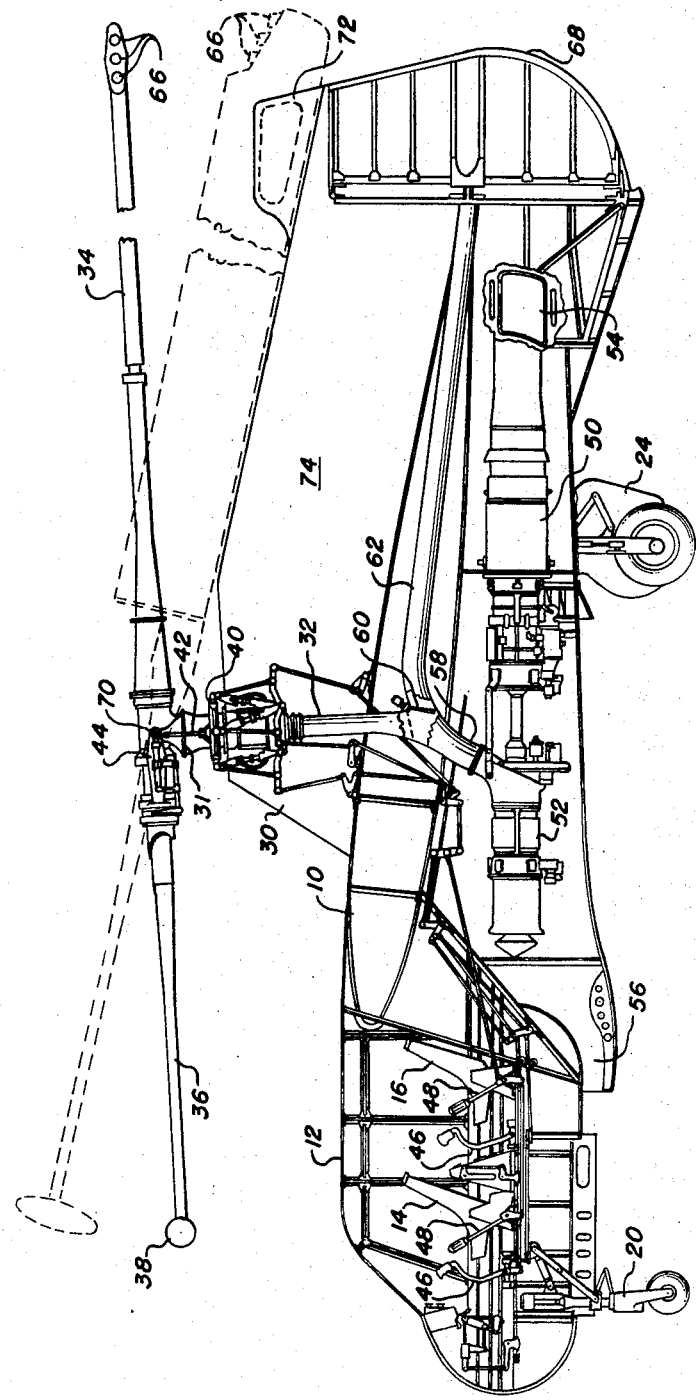

INVENTOR.
EUGENE M. GLUHAREFF
BY
M. B. Tasker
ATTORNEY

INVENTOR.
EUGENE M. GLUHAREFF
ATTORNEY

United States Patent Office  2,953,319
Patented Sept. 20, 1960

2,953,319

CONVERTIPLANE

Eugene M. Gluhareff, Manhattan Beach, Calif., assignor to United Aircraft Corporation, East Hartford, Conn., a corporation of Delaware Filed Jan. 5, 1955, Ser. No. 480,560

(Filed under Rule 47(b) and 35 U.S.C. 118)

7 Claims. (Cl. 244—7)

This invention relates to aircraft capable of either horizontal flight as an airplane or vertical flight as a helicopter and commonly referred to as convertiplanes.

A principal advantage of the convertiplane lies in its ability to take off and land vertically in a small area while enjoying the advantages of high speed and economy of the airplane.

One of the major problems which must be solved in any convertiplane is a satisfactory means to effect transition from vertical flight to horizontal flight and from horizontal flight back to vertical flight.

One of the objects of this invention is to provide a convertiplane in which it is possible to make this transition more readily and without the necessity for loss of lift, stability or control and without unusual velocities or flight attitudes.

Another object of this invention is to provide a convertiplane in which the basic aerodynamic characteristics of the wing and the rotor are similar in that they have substantially the same aspect ratio.

Still another object of the invention is to provide a convertiplane in which the range of angles of attitude of the fixed surface corresponds to the useable range of angles of attitude of the rotor throughout its normal range of operation, and in which stalling of the fixed surface within the normal range of attitudes of the rotor is avoided.

A further object of the invention is a supersonic airplane which will take off and land vertically with the fuselage in a generally horizontal attitude.

A further object of the invention is generally to improve the construction and performance of convertiplanes.

These and other objects and advantages of the invention will be evident from the following detailed description of a preferred embodiment of the invention shown in the accompanying drawings.

In these drawings:

Fig. 2 is a side elevation partly in section of the convertiplane of Fig. 1;

Figure 3:
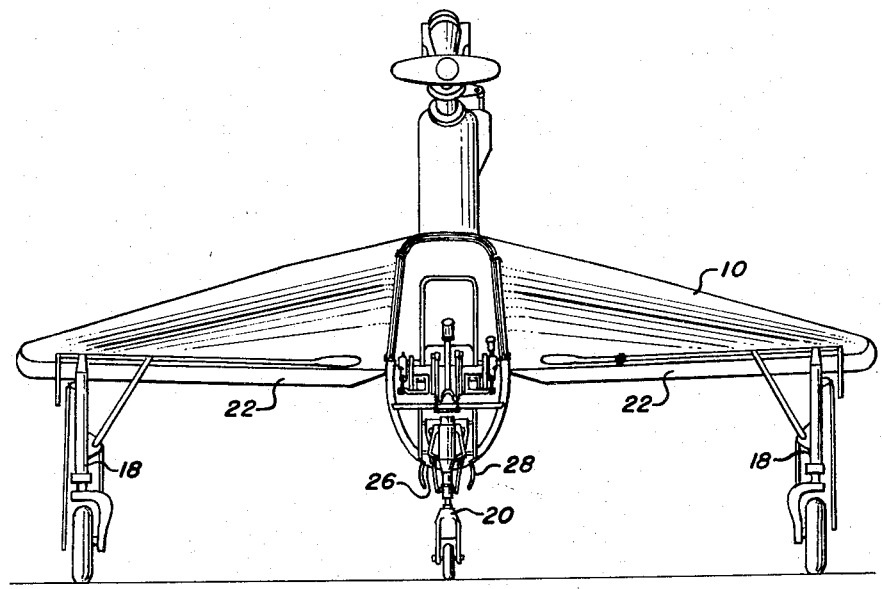
Fig. 3 is a front view of the convertiplane.
Figure 1D:
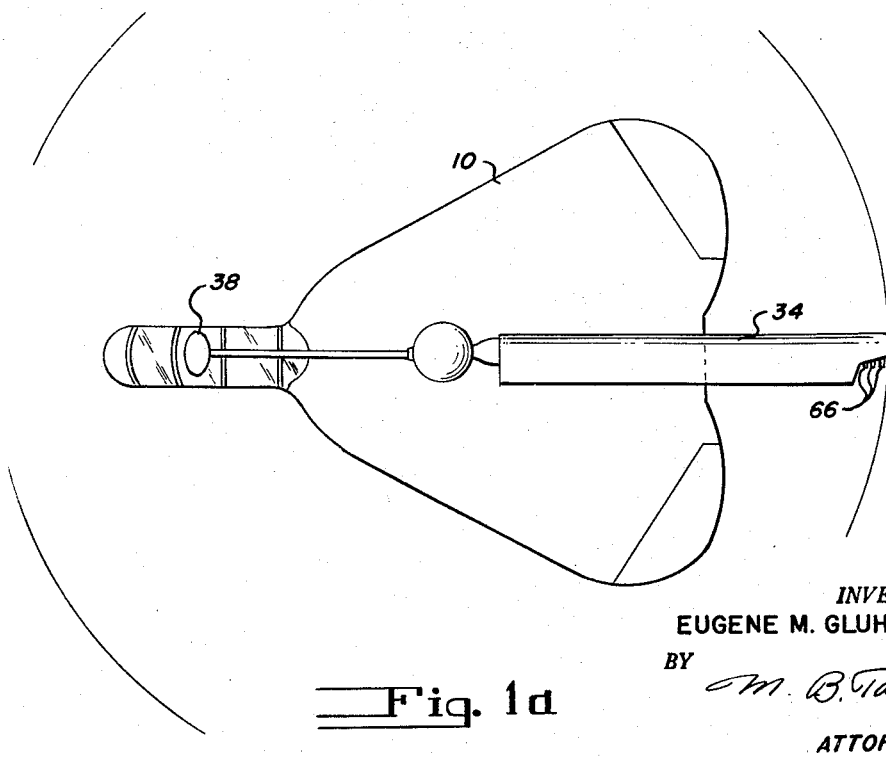
Fig. 1 is a plan view of a convertiplane embodying the invention, a part of the rotor blade being broken away to facilitate illustration.
Fig. 1a is a plan view on a smaller scale of the convertiplane of Fig. 1.
Figure 4:
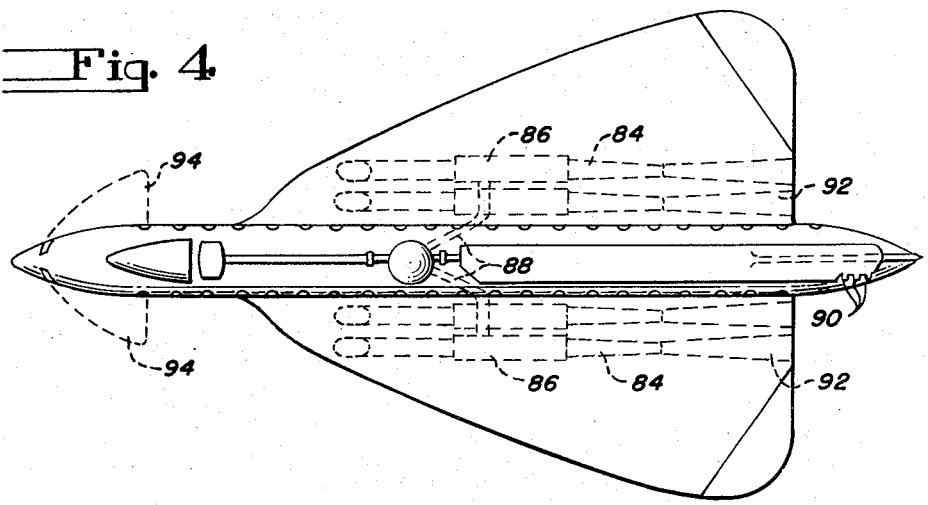
Fig. 4 is a plan view of a larger version of the convertiplane of Figs. 1 to 3.
Figure 5:
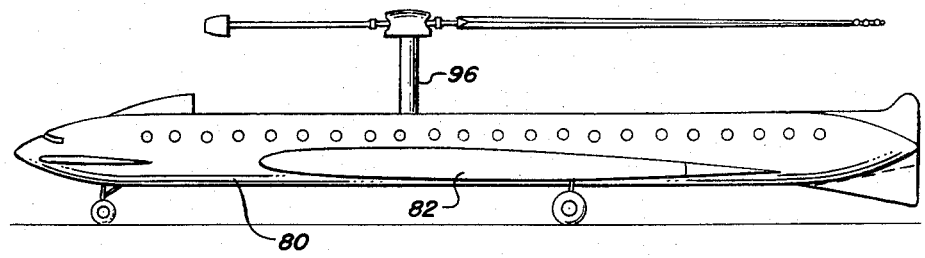
Figs. 5 and 6 are side elevations of the convertiplane of Fig. 4 showing the rotor in extended and retracted positions, respectively.

Referring to Figs. 1 to 3, the convertiplane comprises a dart-shaped, or triangular, wing 10 of low aspect ratio. By low aspect ratio is meant the range between 1 and 2. The aspect ratio of the wing shown herein is approximately 1.27. A fuselage 12 is provided in the wing which projects forwardly of the apex thereof and provides accommodations for a pilot and co-pilot in seats 14 and 16.

When on the ground the aircraft is supported on spaced main landing gear 18 and nose landing gear 20. The main landing gear 18 is foldable laterally inwardly and is received in wells 22 in the underside of the wing, well covers 24 being provided on the landing gear to provide a smooth closure for the wells when the gear is retracted. The forward landing gear 20 is foldable in an aft direction into a well 26 in the bottom of the fuselage, a pair of folding covers 28 providing a smooth closure for the well 26 when the gear is retracted. Usual hydraulic mechanism (not shown) is provided for actuating the landing gear in a well-known manner.

A narrow rotor pylon 30 is provided on the top of the wing through the forward end of which an upstanding hollow mast 32 protrudes. The mast terminates in a hub 31 on which the rotor is mounted. The rotor herein shown has a single blade 34 which is counterbalanced on the opposite side of the mast by an arm 36 carrying a counterweight 38. It will be noted from Fig. 1a that the portion of the blade circle swept by the tip portion of the blade lies well beyond the trailing edge of wing 10. Blade 34 is pivoted on hub 31 for pitch changing movement about its longitudinal axis and a swash plate 40 is provided on the mast rotatable with the blade having a connection 42 to the blade horn 44 for changing the pitch of the blade both cyclically and totally.

For this purpose cyclic pitch sticks 46 and total pitch sticks 48 are provided adjacent each of the pilot's seats which are suitably connected through linkage to the swash plate mechanism. It will be understood that when the total pitch stick is moved the swash plate mechanism is moved bodily up and down to change the pitch of the blade while movement of the cyclic pitch stick either fore and aft or laterally causes tilting of the swash plate mechanism to provide cyclic pitch change in the blade as it rotates.

The aircraft is propelled by a jet engine 50 which drives a compressor 52, the discharge from the jet engine being directed through directional exhaust ducts 54 in the rear of the fuselage beneath the wing, one of which is shown in Fig. 2. It will be understood that the discharge from these ducts is controlled by the pilot by means not shown. Air for the engine and compressor is taken in through an inlet scoop 56 beneath the fuselage.

The compressed air from the compressor 52 is directed through a duct 58 which, as controlled by a damper valve 60, is directed either into the hollow mast 32 to drive the rotor or to the rearwardly directed discharge pipe 62 for forward drive.

When the valve 60 is in the full line position shown in Fig. 2, air is directed upwardly through the mast 32 into the rotor hub 31 and through a spanwise passage in the blade and discharges through the tip of the blade. Here three laterally directed nozzles 66 are shown at the tip of the blade. This provides for driving the rotor blade with no torque reaction other than the friction in the rotor hub bearing. When valve 60 is moved to the dotted position in Fig. 2, the discharge from the compressor is then rearwardly directed through the pipe 62 for forward propulsion of the aircraft.

The discharge ducts 54 provide directional control of the aircraft by the pilot when the aircraft is operating as a helicopter and has no forward movement. A rudder 68 is also provided to assist in the directional control of the aircraft when it is flying as an airplane.

The rotor blade 34 is mounted for flapping movement about a horizontal hinge 70 as shown most clearly in Fig. 2. As previously stated, the rotor blade is journalled for pitch changing movement about its longitudinal axis which movement, when the blade is rotated 90° about its longitudinal axis, permits the blade to be folded about its flapping hinge 70 to a position as shown in dotted line 2 in Fig. 2 in which the blade in effect is "feathered." Mechanism is provided for automatically folding the blade in flight which forms no part of this invention.

The blade is supported in its "feathered" position between a pair of padded stops 72 best shown in dotted lines in Fig. 1 which are provided at the extremity of a narrow fairing 74 extending aft over the top of the wing from the pylon 30.

In operation, the convertiplane takes off as an ordinary helicopter with the valve 60 in the full line position shown in Fig. 2 in which all of the discharge from the compressor is directed into the blade. During take-off any correction that needs to be made in the heading of the helicopter is effected by varying the discharge through the heading ducts 54 under the control of the pilot. When the desired elevation has been reached the pilot, by moving the cyclic pitch control stick forward, uses the rotor blade to propel the ship in a forward direction in the usual manner when flying a helicopter.

When it is desired to fly forward at higher speeds than helicopter speed, the valve 60 is moved to its dotted position, as shown in Fig. 2, to direct the discharge from the compressor 52 through the tail pipe 62 to provide forward propulsion as an airplane. During this transition period, when the rotor will windmill and the aircraft will operate as an autogiro, the rotor is unloaded and the weight of the ship is transferred to the wing. During this transition period the angle of attack of the fixed wing will be increased to a greater positive angle and the speed of the aircraft will increase as power is diverted from the rotor blade to the rear exhaust jet. In order to overcome the drag of the windmilling rotor in high speed flight of the airplane, the blade is "feathered" and lowered onto the stops 72. This is accomplished by moving the cyclic pitch stick forward while the rotor is windmilling due to the air which is now flowing upwardly through the rotor disc. This causes the blade to slow down and finally to trail over the stops 72. As the blade trails over the wing it is moved into "feathered" position and is lowered onto the stops 72 by blade folding mechanism which forms no part of this invention.

When flying as an airplane, the control around the usual three axes is provided by rudder 68 and a pair of elevons 76 located at the wing tips. The elevons may be operated either in unison to provide elevator control or differentially to provide elevon control in a usual manner.

In Figs. 4 to 7 a larger version of the convertiplane is shown in which an elongated fuselage 80 is provided which extends fore and aft of the triangular wing 82. In this form two jet engines 84 are provided which drive compressors 86 and, as in the Figures 1 to 3 form, the discharge from the compressors can be directed either through the ducts 88 to the rotor blade nozzles 90 or through the tail nozzles 92 of the jet engines 84. In this form of the invention retractable forward surfaces 94 are also provided which may be used in the event that it is desired to land the convertiplane as an airplane, or as an air to trim during the conversion period.

Figure 6:
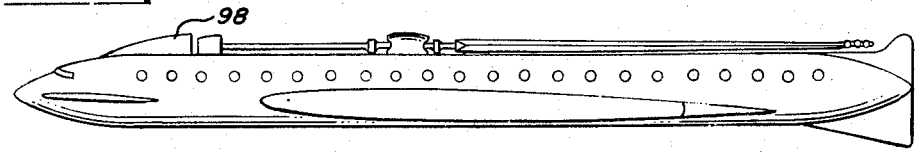
Figure 7:
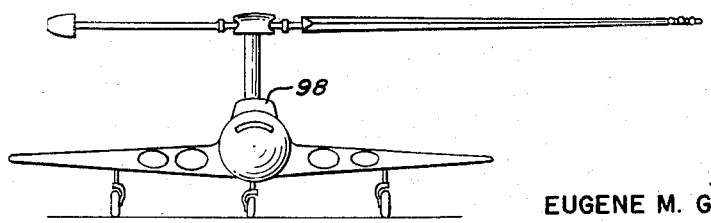
Fig. 7 is a front view of the convertiplane of Fig. 4 with the blade in a different position.

In this modification the hollow mast 96 which supports the rotor blade is retractable (by means not shown) into the fuselage to bring the blade into a faired position on the top of the fuselage as shown in Fig. 6. A forward fairing 98 is provided on the top of the fuselage just forward of the counterweight which reduces the drag due to the retracted blade so that the presence of the retracted blade will not be as severe a penalty when the convertiplane is flying forward at high speed.

A dart-shaped tailless airplane of low aspect ratio has inherently low parasite drag, and due to the sharp sweepback of its leading edge is capable of flying at supersonic speeds without danger of flutter or vibration. This is due in part to the fact that the leading edge of the wing is located in back of the compressibility shock wave coming off the nose of the aircraft. Such a dart-shaped airplane also has good stability characteristics at low speed which makes it particularly desirable as a convertiplane since, despite its ability to fly faster than sound, it is stable within the speed range at which conversion from helicopter to airplane flight takes place.

However, it is well-known that airplanes capable of supersonic speed must have a very small wing area and hence have very high landing speeds. Furthermore conventional high speed jet transports have to operate on such a small margin of fuel reserve that frequently they must make their first landing approach successful. This is obviously extremely hazardous under marginal weather conditions and in areas where heavy air traffic exists. The convertiplane of this invention avoids these disadvantages with a minimum of weight penalty.

I have found that a low aspect ratio dart-shaped wing of the type shown in this application when used in combination with a retractable lifting rotor which is stowable during airplane flight has distinct advantages as a convertiplane.

Among the advantages of this combination are the following: (1) the wing is generally close to the fuselage which keeps the wing out of the downwash of the rotor which is greatest in the area swept by the tips of the blade; (2) since the aspect ratio of the wing is very close to or equal to the aspect ratio of a circle, the wing and the rotor have similar aspect ratio. Accordingly, they have similar lift curves and therefore act in a like manner during transition between airplane and helicopter flight. Thus, when the pilot changes from helicopter flight to airplane flight there is no sudden change in the flight characteristics of the aircraft. The wing will not stall except at angles of attack which are beyond those reached by the rotor under any condition, such, for example, as in a flareout maneuver. Furthermore when flying as a helicopter steep angles of descent into a restricted landing space are possible at reasonable forward speed without danger of stalling the wing even though the angle of attack of the delta wing is as high as 40° which would be impossible with a high aspect ratio wing, and (3) the transition from airplane to helicopter can be accomplished throughout a larger range of angles of attack than possible with a high aspect ratio wing.

It will thus be evident that by providing a dart-shaped tailless airplane of low aspect ratio in combination with a disposable lifting rotor I have produced an airplane having distinct advantages both in the airplane range of flight and also in the transition period between helicopter and airplane flying. Due to the cooperation of the wing and the rotor blade a convertiplane is provided which is capable of extremely high speed flight and yet has all the advantages of a helicopter in takeoff and landing. Further this combination of wing and rotor enables the transition from one mode of flight to the other without undesirable maneuvers and without loss of lift during the process.

I claim:

1. A convertiplane comprising a tailless airplane having an elongated fuselage which lies on the longitudinal axis of the airplane, a fixed wing of generally isosceles triangle plan form which is symmetrical about said longitudinal axis, and a sustaining rotor mounted above said fixed wing for rotation about an upright axis including a rotor blade which sweeps a disc area within the projection of which said fixed wing is included, said fixed wing and said disc area swept by said blade both having an aspect ratio of 1.27.

2. A convertiplane comprising a tailless airplane having an elongated fuselage which lies on the longitudinal axis of the airplane, a fixed wing of generally isosceles triangle plan form which is symmetrical about said longitudinal axis, and a sustaining rotor mounted above said fixed wing for rotation about an upright axis located substantially at the midpoint of the longitudinal axis of the aircraft including a rotor blade having a span more extensive than the projected area of said fixed wing whereby the area swept by the tip portion of said blade lies beyond the projected area of said wing, said fixed wing and said disc area swept by said blade having aspect ratios which are substantially equal.

3. A convertiplane comprising a tailless airplane having an elongated fuselage which lies on the longitudinal axis of the airplane, a fixed wing of generally isosceles triangle plan form which is symmetrical about said longitudinal axis, a mast extending upwardly from said wing on said longitudinal axis, a sustaining rotor mounted on said mast above said wing for rotation including a rotor blade which sweeps a disc area within the projection of which said fixed wing is included, a pylon surrounding said mast, an upstanding vertical central fairing, said fairing extending aft over the top of the wing from the pylon, and a pair of stops spaced to receive the forward edge of a blade to stow it, said stops being mounted at the rear end of said fairing.

4. A convertiplane comprising a tailless airplane having an elongated fuselage which lies on the longitudinal axis of the airplane, a fixed wing of generally isosceles triangle plan form which is symmetrical about said longitudinal axis, a mast extending upwardly from said wing on said longitudinal axis, a sustaining rotor mounted on said mast above said wing for rotation including a rotor blade which sweeps a disc area within the projection of which said fixed wing is included, a pylon surrounding said mast, an upstanding vertical central fairing, said fairing extending aft over the top of the wing from the pylon, and a pair of stops spaced to receive the forward edge of a blade to stow it, said stops being mounted at the rear end of said fairing, the top of said fairing forming a generally parallel line with the top of said wing.

5. A convertiplane comprising a tailless airplane having an elongated fuselage which lies on the longitudinal axis of the airplane, a fixed wing of generally isosceles triangle plan form which is symmetrical about said longitudinal axis, a mast extending upwardly from said wing on said longitudinal axis, a sustaining rotor mounted on said mast above said wing for rotation including a rotor blade which sweeps a disc area within the projection of which said fixed wing is included, a pylon surrounding said mast, an upstanding vertical central fairing, said fairing extending aft over the top of the wing from the pylon, and a pair of stops spaced to receive the forward edge of a blade to stow it, said stops being mounted at the rear end of said fairing, the top of said fairing forming a generally parallel line with the top of said wing, the lower edge of the blade in its stowed position forming a generally parallel line with the top of said fairing.

6. A convertiplane comprising a tailless airplane having an elongated fuselage which lies on the longitudinal axis of the airplane, a fixed wing of generally isosceles triangle plan form which is symmetrical about said longitudinal axis, and a sustaining rotor mounted above said fixed wing for rotation about an upright axis including a rotor blade which sweeps a disc area within the projection of which said fixed wing is included, said fixed wing and said disc area swept by said blade both having an aspect ratio of between 1 and 2.

7. A convertiplane comprising a tailless airplane having an elongated fuselage which lies on the longitudinal axis of the airplane, a fixed wing of generally isosceles triangle plan form which is symmetrical about said longitudinal axis, and a sustaining rotor mounted above said fixed wing for rotation about an upright axis located substantially at the midpoint of the longitudinal axis of the aircraft including a rotor blade having a span more extensive than the projected area of said fixed wing whereby the area swept by the tip portion of said blade lies beyond the projected area of said wing, said fixed wing and said disc area swept by said blade both having an aspect ratio of between 1 and 2.

References Cited in the file of this patent

UNITED STATES PATENTS

| | | |
|---|---|---|
| 1,655,113 | Tesla | Jan. 3, 1928 |
| 2,094,105 | Myers | Sept. 28, 1937 |
| 2,143,137 | Basim | Jan. 10, 1939 |
| 2,187,295 | Alvistur | Jan. 16, 1940 |
| 2,511,502 | Gluhareff | June 13, 1950 |
| 2,690,886 | Laskowitz | Oct. 5, 1954 |

FOREIGN PATENTS

| | | |
|---|---|---|
| 27,937 | Great Britain | of 1913 |